United States Patent Office 3,785,954
Patented Jan. 15, 1974

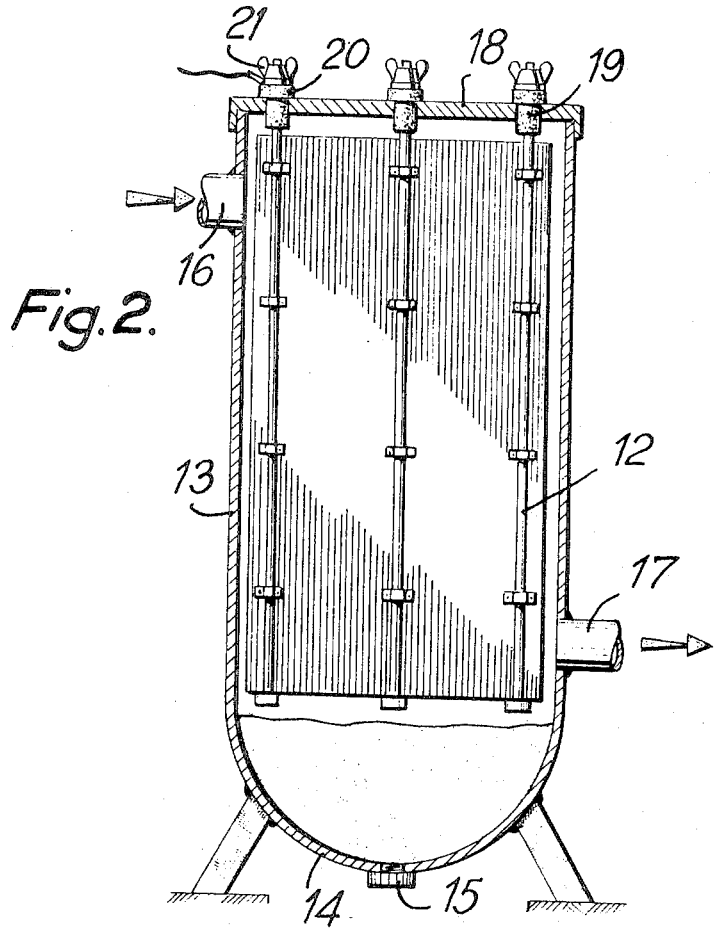
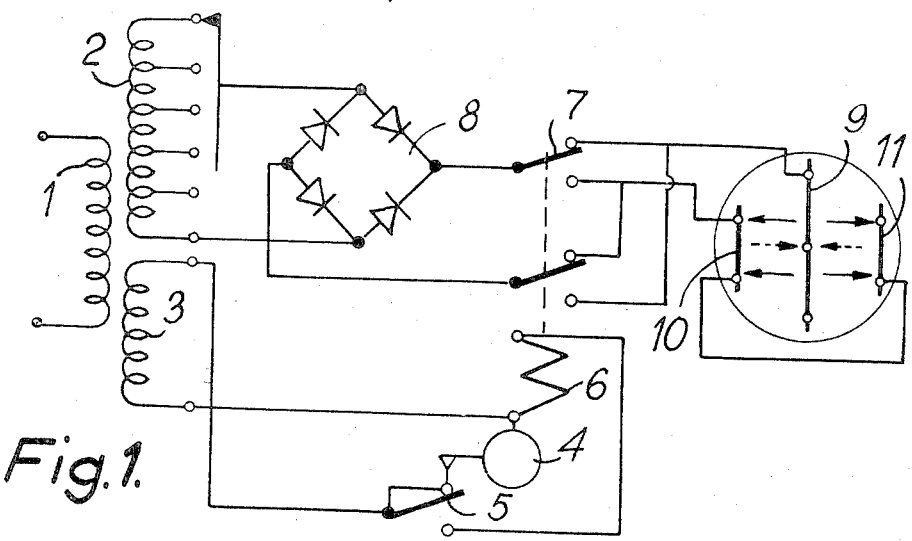

3,785,954
APPARATUS FOR TREATING WATER CHARGED WITH SCALE FORMING SUBSTANCES
Jean Jacques Herbert, 8 Rue Thiers,
Monthyon, France
Filed May 17, 1972, Ser. No. 254,063
Claims priority, application France, May 24, 1971,
7118569
Int. Cl. B01k 3/00; C02b 1/82
U.S. Cl. 204—228        3 Claims

ABSTRACT OF THE DISCLOSURE

Apparatus for treating water by electrical means in order to eliminate scale-generating substances, comprising electrodes dipping into the water to be treated and connected to the mains supply through a transformer having an adjustable secondary connected to a rectifier bridge which is in turn connected to the electrodes for the purpose of obtaining a chopped current having its direction periodically reversed by a timer. The electrodes are flat and are used in sets of three. Each set comprises a central electrode flanked by two parallel-connected lateral electrodes, the electrodes and their supporting current-supplying rods being made of stainless steel.

FIELD AND BACKGROUND OF THE INVENTION

The technical province of this invention is that of water treatment.

Prior art apparatus for treating water in order to obviate the formation of scale in user appliances, based on electric current discharges into the treated water, require the generation of special currents and, specifically, capacitor charging and discharging means, these special currents being applied to electrodes dipping into the water to be treated. Such electrodes are themselves prone to be rapidly covered with scale, and consequently it has been one practice to cause electric current reversals specifically for cleaning the electrodes. Such prior art units, however, are costly to manufacture since, besides the electrical constraints imposed on the current lead-in bushings, they must be able to withstand the pressure of the water and permit ready discharging of the deposits forming therein. All these requirements result in comparatively costly apparatus which do not always function satisfactorily from either the electrical or the mechanical standpoint.

SUMMARY OF THE INVENTION

It is an object of the present invention to overcome these drawbacks and to provide primarily an electrically simplified apparatus in which the mains alternating current first undergoes a voltage matching transformation and simple rectifying and is then directly applied to the descaling electrodes.

The invention further relates to a combination of this energizing mode with a reversing system which switches the operative electrodes.

The invention likewise relates to an apparatus of this kind in which the electrodes are formed by three mutually facing flat parallel plates contained in a plain cylindrical vessel having a rounded bottom equipped with discharge means and a flat top cover, wherein the current lead-in bushings for the connecting conductors to the electrodes consists merely of expandable insulating sheaths. The electrodes are so dimensioned that they offer surfaces that maintain substantially uniform current densities.

This results in an outstandingly simple and inexpensive structure which, in view of the nature of the power supply, offers every safeguard from the electrical standpoint.

The description which follows of a specific embodiment of such a piece of apparatus, given with reference to the accompanying drawing, will give a clear understanding of how the invention can be carried into practice.

BRIEF DESCRIPTION OF THE DRAWING

In the drawing:
FIG. 1 shows the circuit diagram for energizing such apparatus; and
FIG. 2 is an axial sectional view of a descaling treatment vessel.

DESCRIPTION OF THE PREFERRED EMBODIMENT

Reference to FIG. 1 shows that the mains supply is applied to the terminals of a primary winding 1 of a transformer having a multiple-tap secondary winding 2 for adjusting the output voltage and a further secondary winding 3 for powering a timer motor 4 at a constant voltage, motor 4 being adapted to operate a contact 5 for energizing a solenoid 6 which actuates a set of twin reversing contact arms 7. These twin switch arms are connected to the ends of a diagonal branch of a rectifier bridge 8, the ends of the other diagonal branch being connected to the required terminals of secondary 2.

Each of arms 7 cooperates with two contacts which are connected in pairs, respectively to a flat central stainless steel electrode and to two lateral stainless steel flat electrodes 10 and 11, the surface area of the lateral electrodes being substantially less than that of central electrode 9, which electrode is used on both its sides.

The electrodes are attached by buttonhole-shaped openings and crimping to stainless steel rods 12 which serve both as supports and as electric current input conductors, three supports being provided for central electrode 9 and two supports for each of lateral electrodes 10 and 11.

The set of electrodes is inserted into a cylindrical vessel 13 having a hemispherical bottom 14 provided with a drain 15. The top of the wall of vessel 13 is provided with an inlet connection 16 for the water to be treated, a treated-water discharge connection 17 being provided at the bottom of the wall.

Vessel 13 is closed by a flat cover 18, for example, which is provided with insulating expandable bushings 19 topped by insulating washers 20 and terminals to which the tags of the current conductors may be secured by means of nuts 21.

The apparatus hereinbefore described functions as follows:

In an initial phase of operation of motor 4, and relay 6 is deenergized and the switch arms 7 are in contact with contact studs to cause current to flow between central electrode 9 and lateral electrodes 10, 11 in a first direction. In a second phase of operation, solenoid 6 is energized and arms 7 move against the opposite contact studs to cause current to flow between the electrodes in the opposite direction.

These currents are simply rectified and chopped currents at the voltage supplied by the tap selected on secondary winding 2.

The current densities at the surfaces of the electrodes are substantially uniform, so that scale formation of thereon is uniform and descaling upon reversal of the current flow takes place easily.

The scale detached during this operation precipitates to the bottom 14 and can be periodically discharged by systematic drainages, which drainages may be controlled by any convenient means or be carried out subsequent to inspection. Preferably, the electric power supply is caused to be dependent upon the water circulation through the descaling vessel by inserting a pressure switch between primary 1 and the main supply, for example. This arrangement limits the consumption of current and obviates heating and electrolysis phenomena.

The flat shape of cover 18 facilitates fitting and distributing the supply terminals.

The above-described apparatus entails no difficulties from the electrical standpoint since it is devoid of capacitors or other electronic charging or discharging devices, whereby an outstandingly simple and reliable is obtained.

Possible variations in the voltage as a function of the required flow rates and the different qualities of the water to be treated are obtained by appropriately selecting the output voltage from secondary 2 and by adjusting the current reversal time provided by timer 4–5.

In one specific embodiment, the vessel 13 is formed by a tube open at one end and having a wall made of stainless steel with 18% of chromium and 8% of nickel and a thickness chosen between 3 mm. and 5 mm., depending on possible water pressures ranging from 3 kg./cm.$^2$ to 10 kg./cm.$^2$.

This wall is lined on its inner surface with a coating impervious to corrosive waters, such as those containing a notable proportion of carbon anhydride that may extend to the point of saturation.

A suitable material for such a coating is that known by the trade name "Rilsan."

For a tube length from 1.50 m. to 2 m., the inner diameter may be chosen between 400 mm. and 600 mm.

Electrodes 9, 10, 11 may be made likewise of stainless steel of the same grade. When provided in the form of plates as hereinbefore described, the lateral electrodes 10 and 11 have surface areas substantially equal to half the area of the facing sides of central electrode 9. The latter extends over the height of the cylindrical portion of vessel 13, diametrically thereto, but with gaps between its vertical ends and the coated wall of the vessel.

The lateral electrodes are arranged parallel to the central electrode and are likewise spaced from the wall of vessel 13. The areas are chosen so as to establish uniform electric current densities irrespective of the direction of flow of the current, in order to permit both descaling of the electrodes and continuation of the water treatment.

Alternatively, the electrodes may be provided in the form of a bundle of parallel rods spaced from one another, with a central electrode and a plurality of equidistant peripheral electrodes. By way of example, it would be possible to have a central rod with a diameter of 48 mm. and five peripheral rods with a diameter of 18 mm. in order to ensure equivalent surface areas offered for passage of the electric current irrespective of the direction of flow.

Considering next the electric power supply means in the case of a vessel 13 with a height of 1500 mm. and a diameter of 400 mm., the transformer primary may likewise comprise multiple taps to permit connection to 220, 250 or 380 volt line supplies. Secondary winding 2 may have outputs delivering voltages stepped from 24 volts to 96 volts for current intensities of approximately 20 amperes, with consumption possibly rising to 1440 va.

The current consumption depends on the resistivity of the water being treated.

The bridge diodes may be those bearing the designation BF E 36 with a current rating of 40 a.

It goes without saying that changes and substitutions may be made to the embodiment described hereinabove without departing from the scope of the invention.

What I claim is:

1. Apparatus for treating water charged with substances liable to form scale in user appliances, comprising, in combination, a vessel adapted to contain the water to be treated; electrodes mounted in said vessel and adapted to dip into the water to be treated; a transformer having a primary winding, for connection to a commercial source of A.C. potential, and an adjustable voltage secondary winding; a rectifier bridge having input terminals connected directly to terminals of said secondary winding; a polarity reversing switch connecting the output terminals of said rectifier bridge directly to said electrodes; and a timer operating said reversing switch; said electrodes being flat stainless steel plates arranged in spaced parallel relation in sets of three, with each set including a central electrode and two lateral electrodes one one each side of the central electrode, the two lateral electrodes being connected in parallel to said reversing switch and each having a surface area less than that of the respective facing suface area of the central electrode whereby the current densities on the electrodes are substantially uniform.

2. Apparatus as claimed in claim 1, including conducting rods having said electrodes secured thereto and supporting said electrodes in said vessel; said vessel having a flat top cover provided with respective water tight and insulating bushings for each conducting rod; said vessel having a top inlet and a bottom outlet in its side wall for the treated water; said vessel having an internally concave bottom end wall formed with means for discharging deposits.

3. Apparatus as claimed in claim 1, in which said timer is an electric motor connected to a second secondary winding of said transformer.

References Cited

UNITED STATES PATENTS

| | | | |
|---|---|---|---|
| 3,654,119 | 4/1972 | White et al. | 204—228 |
| 3,637,482 | 1/1972 | Vajda | 204—228 |
| 2,864,750 | 12/1958 | Hughes, Jr. et al. | 204—228 X |
| 3,198,724 | 8/1965 | Cross et al. | 204—228 X |
| 2,977,296 | 3/1961 | Ryan | 204—229 X |

JOHN H. MACK, Primary Examiner

D. R. VALENTINE, Assistant Examiner

U.S. Cl. X.R.

204—149, 275